(12) United States Patent
Luffel (10) Patent No.: US 6,909,577 B2
(45) Date of Patent: Jun. 21, 2005

(54) LOW-OVERHEAD STORAGE MAGAZINE

(75) Inventor: Robert Wesley Luffel, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 10/165,820

(22) Filed: Jun. 7, 2002

(65) Prior Publication Data

US 2003/0227708 A1 Dec. 11, 2003

(51) Int. Cl.$^7$ .............................................. G11B 15/68
(52) U.S. Cl. ....................................................... 360/92
(58) Field of Search ................................ 360/92, 98.06; 369/30.28, 30.31, 30.34–30.35, 30.39, 30.53, 30.61, 30.63, 30.67, 30.72, 30.78, 30.8, 30.87, 34–38; 211/40, 41.12, 43

(56) References Cited

U.S. PATENT DOCUMENTS

| | | | | |
|---|---|---|---|---|
| 3,561,853 A | * | 2/1971 | Thevenaz | 352/123 |
| 3,787,115 A | * | 1/1974 | Fischer | 352/123 |
| 3,791,622 A | * | 2/1974 | Nupnau | 352/123 |
| 3,850,303 A | * | 11/1974 | Franklin | 211/134 |
| 3,996,616 A | * | 12/1976 | Sturrock et al. | 360/92 |
| 3,996,617 A | * | 12/1976 | Cousino | 360/92 |
| 4,240,120 A | * | 12/1980 | Padwa | 360/15 |
| 5,069,349 A | * | 12/1991 | Wear et al. | 211/59.3 |
| 5,264,974 A | * | 11/1993 | Campbell et al. | 360/92 |
| 5,287,459 A | * | 2/1994 | Gniewek | 711/111 |
| 5,325,792 A | | 7/1994 | Mulloy | |
| 5,537,268 A | * | 7/1996 | Felde et al. | 360/92 |
| 5,547,086 A | | 8/1996 | Chen | |
| 5,622,470 A | * | 4/1997 | Schaefer et al. | 414/807 |
| 5,765,697 A | * | 6/1998 | Soong | 211/11 |
| 5,995,320 A | * | 11/1999 | Ostwald | 360/92 |
| 6,155,766 A | * | 12/2000 | Ostwald et al. | 414/279 |
| 6,352,161 B1 | * | 3/2002 | Huang | 211/40 |
| 6,353,581 B1 | * | 3/2002 | Offerman et al. | 369/30.4 |
| 6,411,462 B1 | * | 6/2002 | Ostwald et al. | 360/92 |
| 6,600,623 B2 | * | 7/2003 | Ostwald et al. | 360/92 |

FOREIGN PATENT DOCUMENTS

JP      60010452      1/1985

OTHER PUBLICATIONS

European Search Report from foreign counterpart.

* cited by examiner

Primary Examiner—Angel A Castro (57) ABSTRACT

A low-overhead storage magazine and method for storing at least one data cartridge therein. According to a preferred embodiment of the invention, the low-overhead storage magazine comprises a frame assembly having a chamber formed therein sized to receive a plurality of data cartridges, and a partition mounted to the frame assembly and movable in the chamber to define an adjustable storage area. A method for mapping the low-overhead storage magazine is also disclosed.

26 Claims, 9 Drawing Sheets

FIG. 9

LOW-OVERHEAD STORAGE MAGAZINE

FIELD OF THE INVENTION

The invention generally pertains to storage magazines, and more specifically, to low-overhead storage magazines.

BACKGROUND OF THE INVENTION

Media storage systems are well-known in the art and are commonly used to store data cartridges at known locations and to retrieve desired data cartridges as needed so that data may be written to and/or read from the data cartridges. Such media storage systems are also often referred to as autochangers or library storage systems.

A typical media storage system may be provided with a cartridge-engaging assembly or "picker" for engaging the various data cartridges stored therein. The cartridge-engaging assembly typically also includes a positioning device for moving the cartridge-engaging assembly within the media storage system to transport the data cartridges therein. For example, the cartridge-engaging assembly may transport a data cartridge from a "mail slot" for loading data cartridges into the media storage system, to a storage magazine. Alternatively, the cartridge-engaging assembly may transport a data cartridge stored in a storage magazine to a cartridge read/write device.

Storage magazines generally serve to provide storage locations for the data cartridges in the media storage system. The storage magazines may be located at any convenient position in the media storage system, and typically are arranged so that they form one or more vertical stacks, although other arrangements are also possible.

The data cartridges are typically stored in individual storage locations formed within the storage magazines. These storage locations may be individually defined by divider walls that separate adjacent storage locations from one another. Accordingly, each data cartridge may be separately stored in an individual storage location that is readily identified in the storage magazine so that each data cartridge can be readily retrieved for access to the data stored thereon.

Storage magazines having individual storage locations, such as those just described, necessarily incorporate undesirable overhead into the design of the media storage system (i.e., each divider wall takes up space that cannot be used to store data cartridges). Although the divider walls may be very thin, the dividers still significantly reduce the storage density of the media storage system (i.e., the number of data cartridges that can be stored in a defined space). For example, a single 4 millimeter (mm) divider wall used between two storage locations each sized for a 21.4 mm linear tape open (LTO) data cartridge reduces the available capacity of the storage magazine by nearly 10%.

In addition, the individual storage locations in the storage magazine must be manufactured to a precise tolerance so that the data cartridges can be inserted and withdrawn without becoming twisted and lodged between the dividers during operation. Likewise, the storage magazines must be separately manufactured, or retrofitted, for use with different sizes of data cartridges (e.g., digital linear tape (DLT) and LTO data cartridges). These factors tend to increase the cost of manufacture and/or use of the storage magazines.

SUMMARY OF THE INVENTION

An embodiment of a low-overhead storage magazine may comprise a frame assembly having a chamber formed therein sized to receive a plurality of data cartridges, and a partition mounted to the frame assembly and movable in the chamber to define an adjustable storage area for the plurality of data cartridges.

A method for storing at least one data cartridge in a low-overhead storage magazine according to one embodiment may comprise increasing the size of an adjustable storage area formed within the low-overhead storage magazine before inserting the data cartridge therein, and decreasing the size of the storage area formed within the low-overhead storage magazine after removing the data cartridge therefrom.

A method for mapping a plurality of data cartridges in a low-overhead storage magazine is also disclosed and may, according to one embodiment, comprise assigning an added data cartridge to a new location within the low-overhead storage magazine, and reassigning a shifted data cartridge to another location within the low-overhead storage magazine when another data cartridge is removed.

BRIEF DESCRIPTION OF THE DRAWINGS

Illustrative and presently preferred embodiments of the invention are illustrated in the drawings, in which.

DETAILED DESCRIPTION

Figure 1:
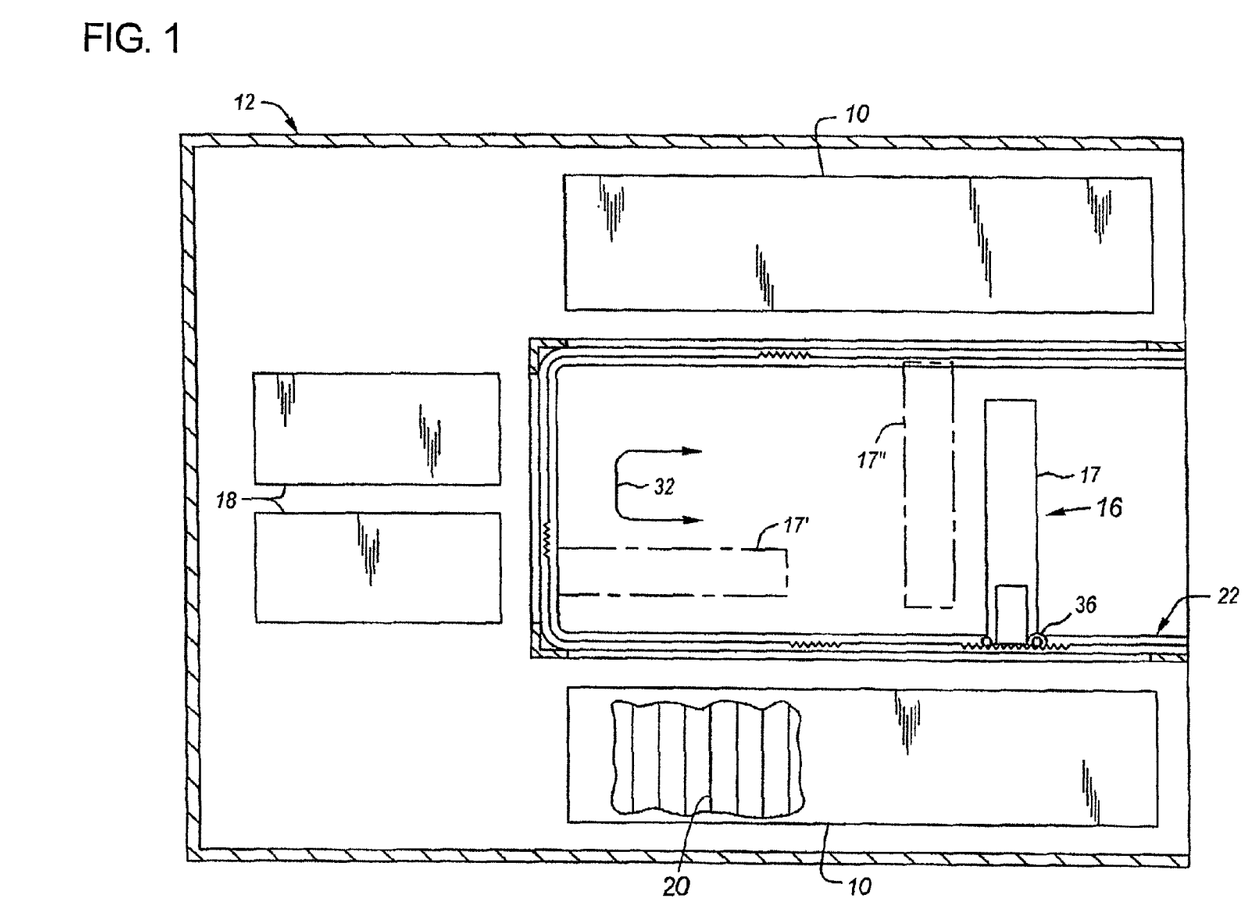
FIG. 1 is a plan view of a media storage system as it may be used according to one embodiment of the invention to store and access data cartridges therein.

An embodiment of low-overhead storage magazine 10 may be used according to the teachings of the invention with any suitable media storage system 12, such as that shown in FIG. 1. According to one embodiment, such a media storage system 12 may be used to store a number of data cartridges 20 in one or more storage magazines 10 and to provide access to data stored thereon at one or more read/write devices 18. Storage magazine(s) 10 and read/write device(s) 18 may be positioned at various locations within media storage system 12 so that they define a generally U-shaped configuration, as best seen in FIG. 1. However, storage magazine 10 of the present invention may also be used in any of a wide range of other types of media storage systems now known or that may be later developed.

When a user makes a request to access a particular data cartridge 20, a control system (not shown) moves a cartridge-engaging assembly 16 along a positioning rail 22 in the directions of arrow 32 adjacent the desired data cartridge 20 stored therein. For purposes of illustration, cartridge-engaging assembly 16 is shown in positions 17, 17', and 17" in FIG. 1. Cartridge-engaging assembly 16 is shown positioned adjacent the storage magazine 16 at positions 17 and 17", and is shown adjacent read/write device 18 at position 17'. The cartridge-engaging assembly 16 transports data cartridge 20 about the media storage system 12, for example, between read/write device 18 and storage magazines 10.

Figure 2:
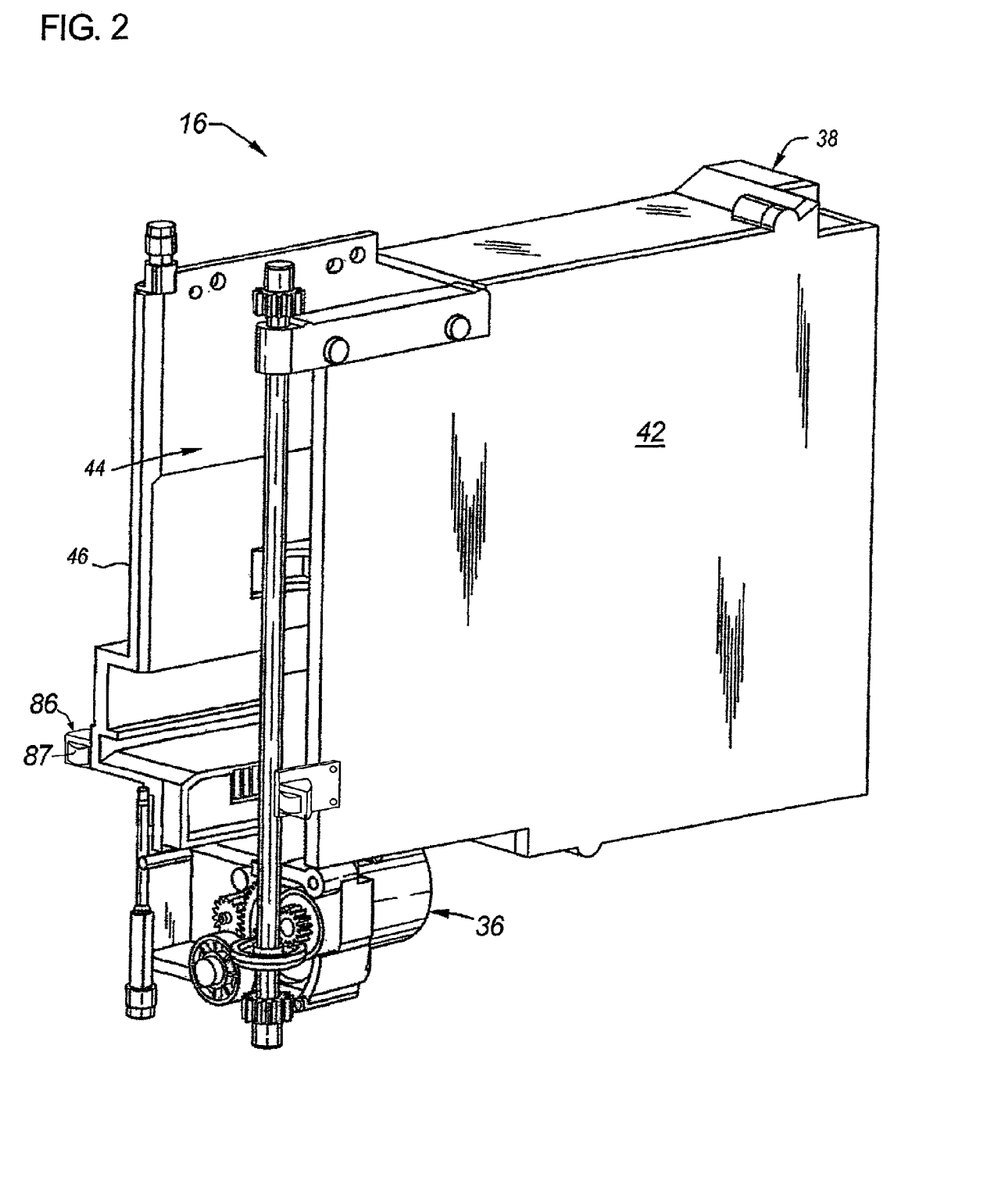
FIG. 2 is a perspective view of one embodiment of a cartridge-engaging assembly for use with the media storage system shown in FIG. 1.
Figure 3:
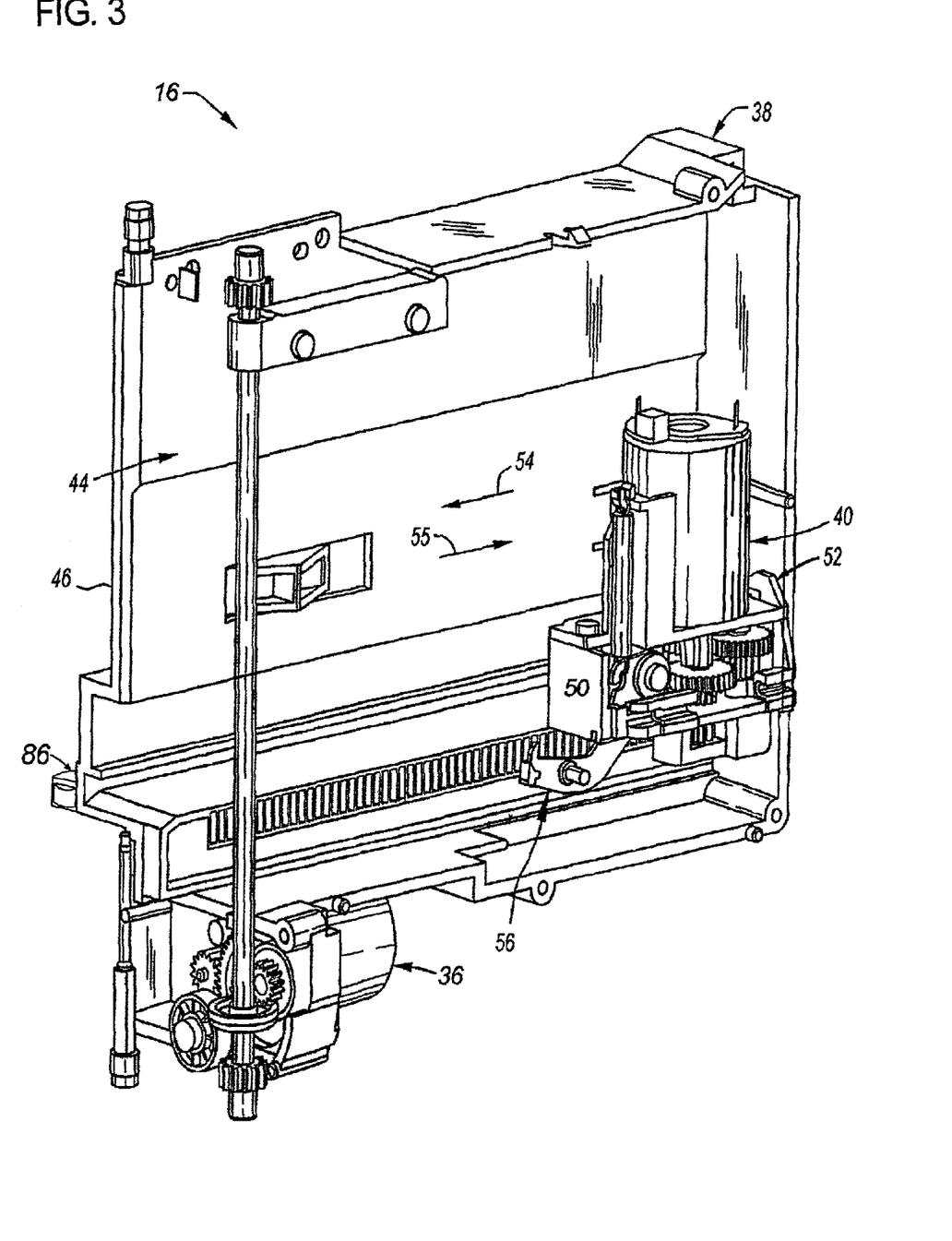
FIG. 3 is a perspective view of the cartridge-engaging assembly shown in FIG. 2 having a side member removed to show an embodiment of a plunge mechanism therein.

A cartridge-engaging assembly 16 that may be used according to one embodiment of the invention is shown in more detail in FIG. 2, and is also shown in FIG. 3 with a side 42 removed therefrom. The cartridge-engaging assembly 16 may comprise a housing 38 that defines a cavity 44 sized to receive data cartridge 20. A plunge mechanism or "thumb assembly" 40 is slidably mounted to housing 38 so that plunge mechanism 40 may be moved toward and away from cartridge access end 46 of the housing 38, generally in the directions indicated by arrows 54 and 55, respectively. More specifically, plunge mechanism 40 may be moved between a retracted position (shown in FIG. 8) and an extended position (shown in FIG. 9).

Cartridge-engaging assembly 16 is adapted to engage data cartridge 20, withdraw data cartridge 20 (e.g., from storage magazine 10) for transport within the media storage system 12, and to eject data cartridge 20 at the intended destination (e.g., into read/write device 18). Movement of the cartridge-engaging assembly 16 may be achieved, in part, via an actuator system 36 which moves the cartridge-engaging assembly 16 in media storage system 12.

Figure 4:
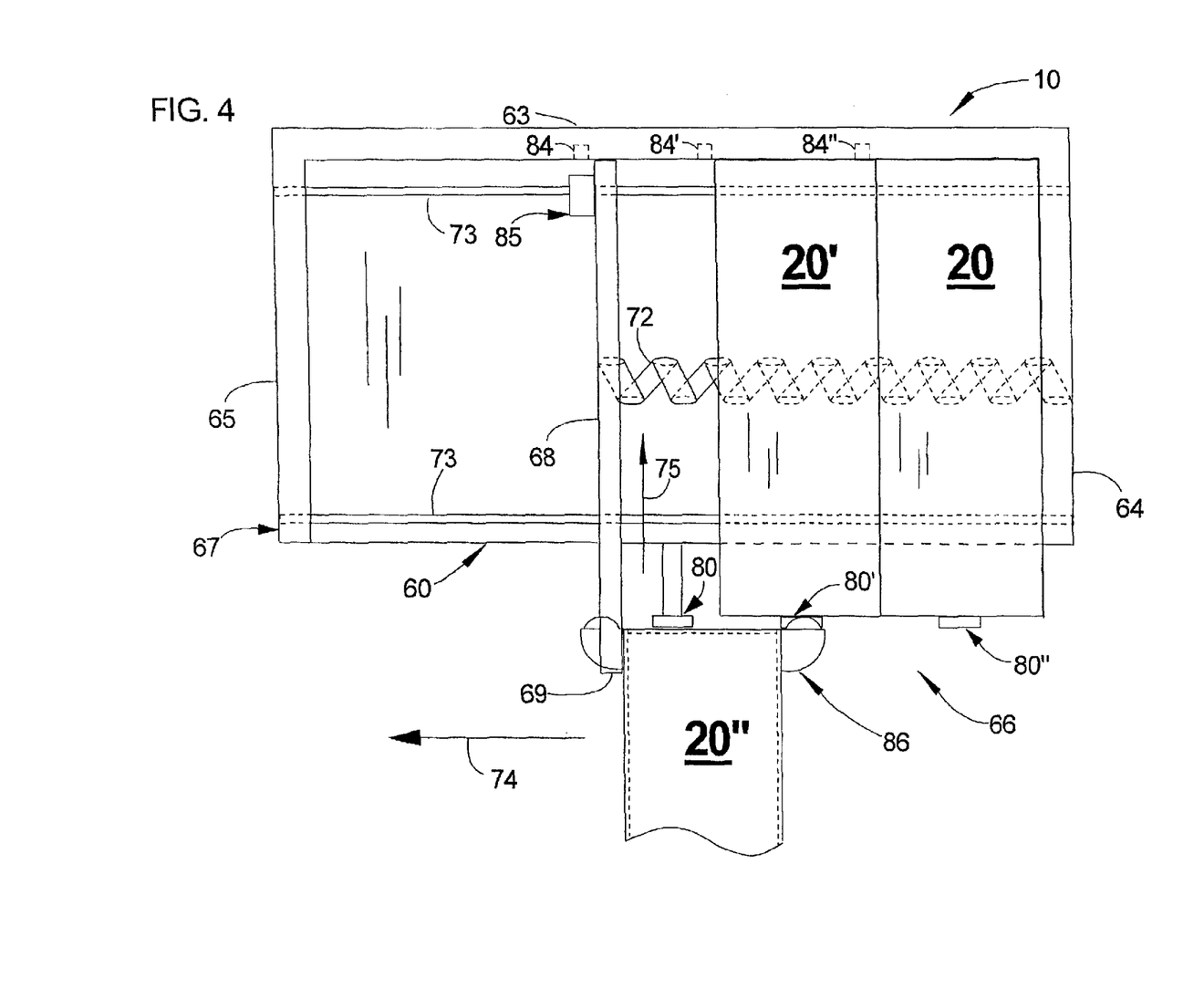
FIG. 4 is a simplified plan view of an embodiment of a storage magazine illustrating insertion of a third data cartridge therein according to one embodiment of the invention.

Optionally, the cartridge-engaging assembly 16 may be provided with one or more retaining members 86 (FIG. 3 and FIG. 4). Retaining member 86 may be provided for retaining one or more data cartridges (e.g., the first and third data cartridges 20 and 20") within storage magazine 10 while another data cartridge (e.g., the second data cartridge 20') is being removed, as discussed in more detail below. According to one embodiment, retaining member 86 may comprise a bearing or "roller" 87. Roller 87 allows the cartridge-engaging assembly 16 to readily pass or "roll" over data cartridges 20 as it is moved in the media storage system 12. In addition, when the cartridge-engaging assembly 16 is ready to retrieve data cartridge 20 from storage magazine 10, bearing member 87 provides a biasing force against the data cartridges that are adjacent to the data cartridge that is being removed from storage magazine 10.

Other embodiments of the retaining member(s) 86 are also contemplated as being within the scope of the invention. For example, retaining member 86 may comprise a low-friction pad (e.g., made of Teflon®) in place of roller 87. In other embodiments, retaining member 86 may comprise one or more extendible arms mounted to the cartridge-engaging assembly 16. Such embodiments are provided only by way of example and are not intended to limit the scope of the invention thereto. It is expected that other embodiments will also occur to those skilled in the art after having become familiar with the teachings of the invention.

The foregoing description of media storage system 12 and cartridge-engaging assembly 16 is provided in order to better understand one environment in which the low-overhead storage magazine 10 of the present invention may be used. However, it should be understood that low-overhead storage magazine 10 may be used in any of a wide range of other types of media storage systems, and in conjunction with any of a wide range of cartridge-engaging assemblies now known or that may be developed in the future. Consequently, low-overhead storage magazine 10 of the present invention should not be regarded as being limited to use with the particular media storage system 12 and cartridge-engaging assembly 16 shown and described herein. Also, because more detailed descriptions of media storage system 12 and cartridge-engaging assembly 16 are not required to understand or practice the invention, the particular media storage system 12 and cartridge-engaging assembly 16 that storage magazine 10 may be used in conjunction with will not be described in further detail herein.

One embodiment of low-overhead storage magazine 10 is shown and described with reference to FIG. 4 through FIG. 9 as it may be used with media storage system 12 according to the teachings of the invention. In this embodiment, storage magazine 10 may comprise a frame assembly 67 having a back panel 63 and opposing side panels 64, 65 shown in FIG. 4, and top and bottom panels 61, 62 shown in FIG. 5. Together, these panels 61, 62, 63, 64 and 65 define a cavity or chamber 60 in frame assembly 67 that is sized to receive a plurality of data cartridges 20 therein as shown, for example, in FIG. 4.

Storage magazine 10 may also comprise a partition 68 mounted within chamber 60 to move therein and define an adjustable or variable storage area 66. A portion or tab 69 may be formed on partition 68 (best seen in FIG. 5) that extends into the path of cartridge-engaging assembly 16 in the media storage system 12. Tab 69 may be provided for contacting the cartridge-engaging assembly 16 as it is moved adjacent storage magazine 10 to move partition 68, as will be described in more detail below.

Figure 5:
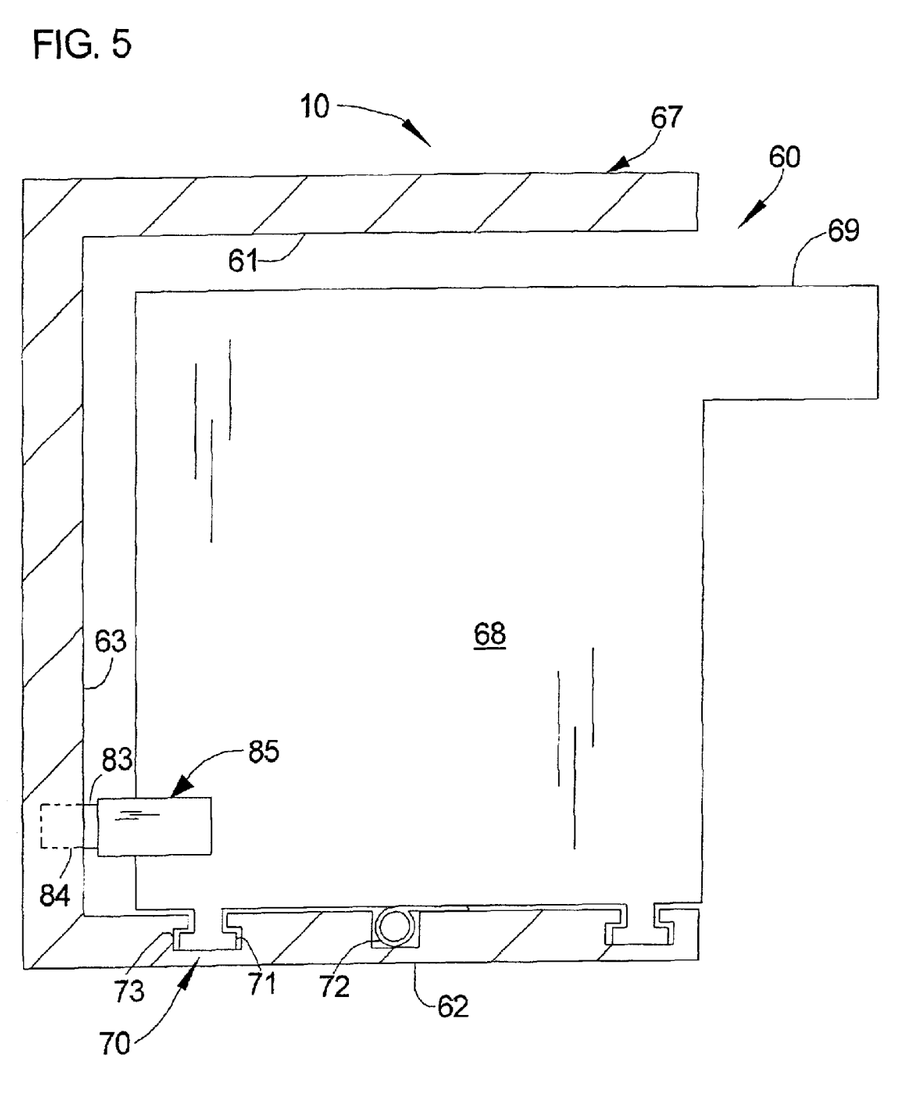
FIG. 5 is a partial side view of the storage magazine shown in FIG. 4, wherein an embodiment of the partition is shown in more detail.

Partition 68 may be slidably mounted in storage magazine 10 to guide system 70, as shown in more detail in FIG. 5. According to the embodiment shown, guide system 70 may comprise a channel 73 formed in the bottom panel 62 of storage magazine 10 that extends between opposing side panels 64 and 65 of storage magazine 10 (see FIG. 4). A bracket 71 may be mounted to or otherwise formed on partition 68. Bracket 71 slidably engages the channel 73. Accordingly, partition 68 may be moved within the storage chamber 60 of storage magazine 10 to increase or decrease the size of adjustable storage area 66. For example, partition 68 may be moved in the direction of arrow 74 in FIG. 4 to increase the size of adjustable storage area 66, or partition 68 may be moved in the opposite direction to decrease the size of the adjustable storage area 66, as will be explained in more detail below.

It is understood that other embodiments for mounting the partition 68 in the storage magazine 10 are also contemplated as being within the scope of the invention. In other embodiments, guide system 70 may comprise one or more channels 73 formed in the bottom panel 62, the back panel 63, and/or the top panel 61. In another embodiment, guide system 70 may comprise a rail mounted to storage magazine 10, wherein the partition 68 is adapted to engage and move on the rail.

Storage magazine 10 may also comprise a biasing member 72 (FIG. 4) mounted therein and operatively associated with partition 68. According to one embodiment shown in FIG. 4 and FIG. 5, biasing member 72 comprises a spring that is attached at one end to side panel 64 of the storage magazine 10, and at its other end to partition 68. Accordingly, partition 68 is resiliently biased toward a "home" position (e.g., toward side panel 64). Partition 68 may be moved in the direction of arrow 74 (FIG. 4) against the biasing force of spring 72 to expand the size of adjustable storage area 66, and partition 68 may be moved in the opposite direction under the force of spring 72 to contract the size of adjustable storage area 66.

Before proceeding, it is noted that the invention is not to be limited to an embodiment such as that just described. For example, other embodiments may comprise one or more compression springs (not shown) that exert a force in a direction opposite to that of spring 72. Alternatively, for example, partition 68 need not be resiliently biased.

Figure 6:
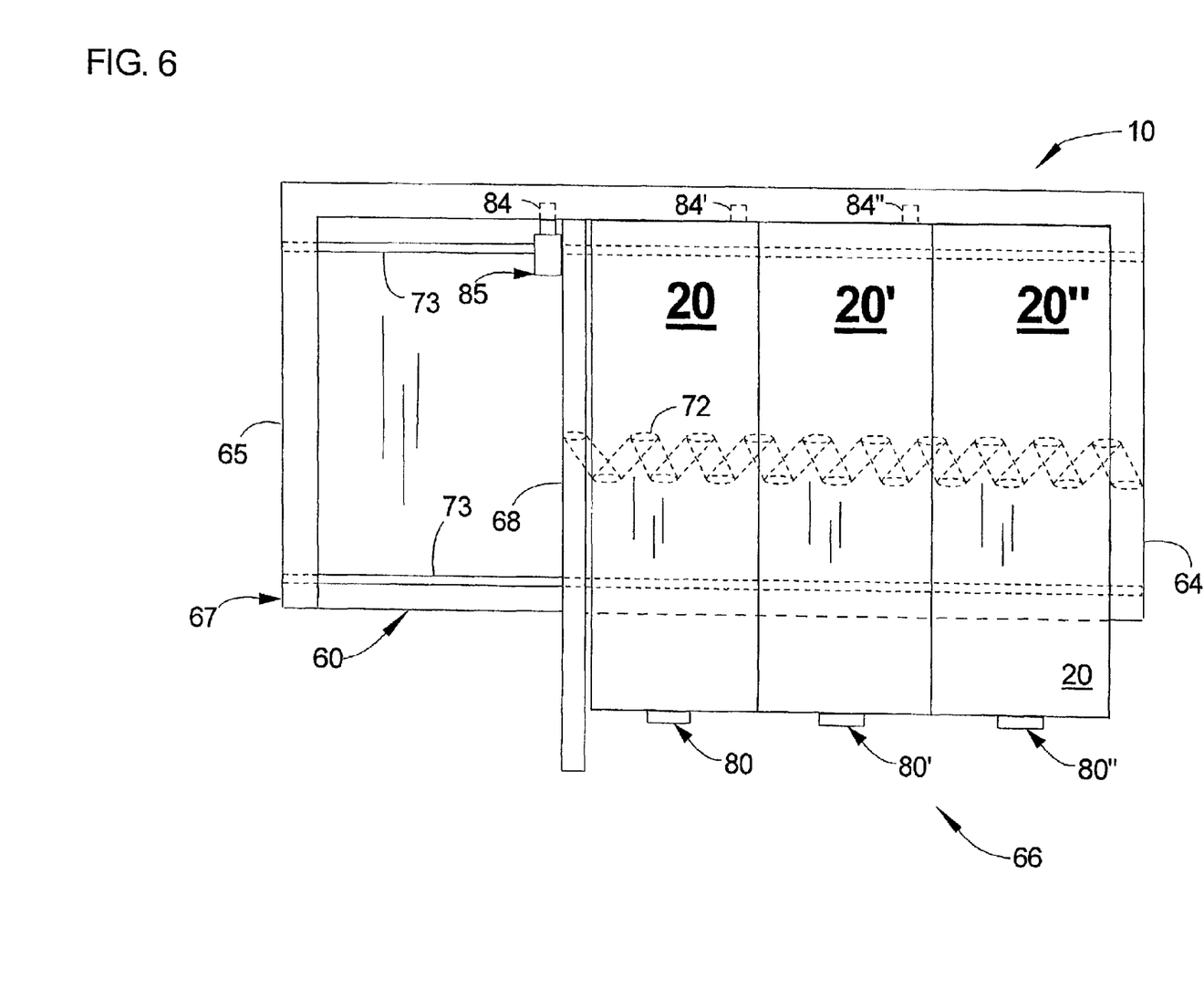
FIG. 6 is a simplified plan view of the storage magazine shown in FIG. 4 with the third data cartridge inserted therein.

Storage magazine 10 may also be provided with an optional lock 85 that may be actuated to fix the position of partition 68 and to release pressure applied by the biasing member 72 on data cartridge(s) 20 stored in the adjustable storage area 66. In one embodiment, lock 85 may comprise a solenoid that operates pin 83 to move between an open position (FIG. 4) and a closed position (FIG. 6). When lock 85 is in the closed position, pin 83 is extended to engage one of the notches 84, 84', 84" (hereinafter referred to as notch(es) 84 unless referring to individual notches for purposes of illustration) formed in back panel 63 of storage magazine 10. Accordingly, lock 85 holds partition 68 in a fixed position and releases or relaxes pressure that is being applied to the data cartridges 20 by spring 72. When lock 85 is in the open position, pin 83 is retracted, or pulled away from the back panel 63 of storage magazine 10, thus allowing partition 68 to be readily moved therein (e.g., on guide system 70). However, it is understood that other suitable locks may also be provided for use with storage magazine 10, and the invention is not limited to any particular type of lock.

Figure 8:
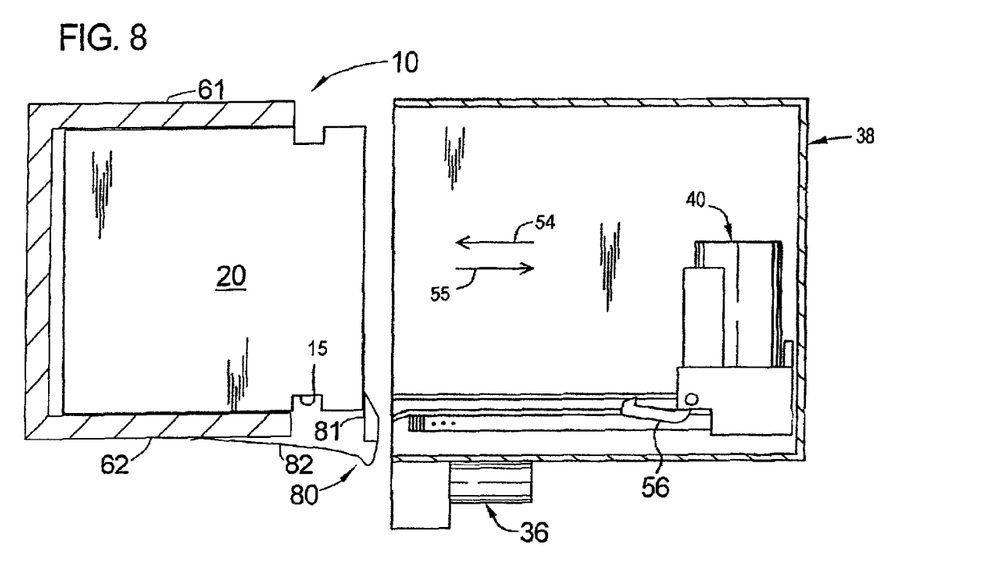
FIG. 8 is a simplified, side elevation of a cartridge-engaging assembly shown according to one embodiment of the invention positioned adjacent a data cartridge stored in a storage magazine, wherein the plunge mechanism of the cartridge-engaging assembly is in a retracted position.
Figure 9:
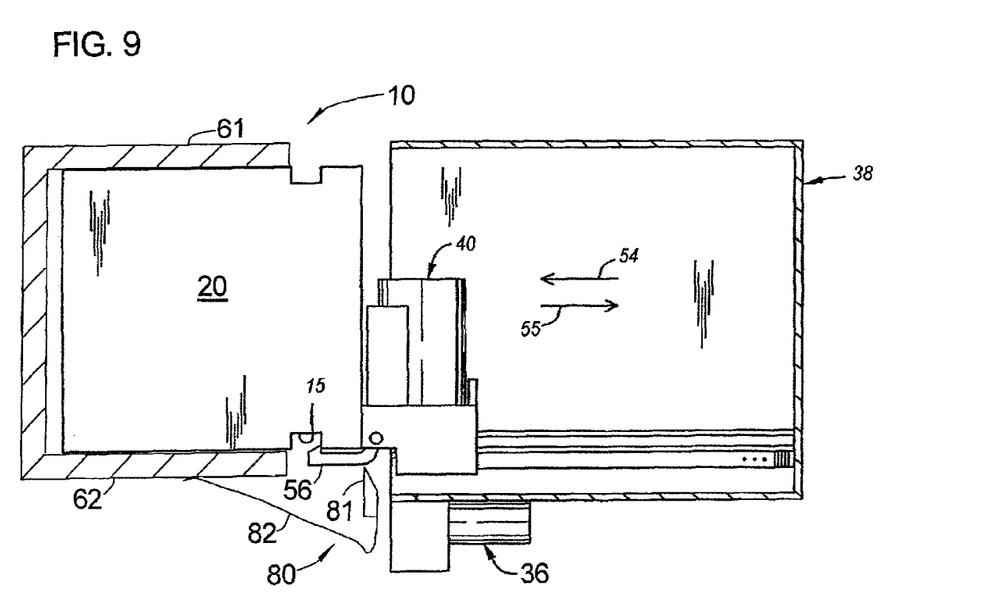
FIG. 9 is a simplified, side elevation of a cartridge-engaging assembly shown according to one embodiment of the invention positioned adjacent a data cartridge stored in a storage magazine, wherein the plunge mechanism of the cartridge-engaging assembly is in an extended position.

Storage magazine 10 may also be provided with a number of gates 80, 80', 80", shown in more detail in FIG. 8 and FIG. 9. Gates 80, 80', 80" (hereinafter referred to as gate(s) 80 unless referring to individual gates for purposes of illustration) serve to retain one or more of the data cartridges 20 within the storage magazine 10 when the storage magazine 10 is being handled (e.g., when it is moved from one media storage system to another). Gate 80 may also be used in place of, or in addition to retaining member 86 on the cartridge-engaging assembly 16 to hold adjacent data cartridges while one of the data cartridges is being removed from the storage magazine 10.

According to one embodiment, gate 80 may be mounted to the storage magazine 10 (e.g., the bottom panel 62) with resilient member 82. Resilient member 82 may be made of any suitable material, such as resilient plastic, metal, composite material, etc. Gate 80 may also include guide 81 formed on resilient member 82. Guide portion 81 may be formed as part of the resilient member 82, for example, by molding or shaping resilient member 82 to form guide portion 81 thereon. Alternatively, guide portion 81 may be separately manufactured and assembled thereon. For example, guide portion 81 may be made from a soft foam or plastic, and hence may also serve to reduce wear on data cartridges 20.

In use, gate 80 may be opened to provide access to data cartridge 20 by the cartridge-engaging assembly 16. More specifically, when the cartridge-engaging assembly 16 is operated to retrieve data cartridge 20 from storage magazine 10, the finger assembly 56 comes into contact with guide 81. As the finger assembly 56 passes over guide 81, it depresses gate 80 and opens it, as described in more detail below.

Although one embodiment of gate 80 is shown and described herein, it is understood that other embodiments are also contemplated as being within the scope of the invention. For example, gate 80 may comprise a retaining member or wall with a sliding window formed therein. Accordingly, the data cartridges 20 are retained in the storage magazine 10 behind the wall portion and the window portion moves in conjunction with the cartridge-engaging assembly 16 to provide access to individual data cartridges 20 stored therein. As another example, gate 80 may be electronically operable between an open position and a closed position. Yet other embodiments are also contemplated as being within the scope of the invention and may depend on various design considerations, such as, but not limited to the configuration of the data cartridges 20. For example, gate 80 may engage the data cartridges 20 in notch 15.

Before proceeding to discuss operation of the storage magazine 10 according to embodiments of the invention, it should be noted that the invention is not to be limited to the various embodiments described above. It is also expected that other embodiments of storage magazine 10 and/or of various components thereof will also occur to those skilled in the art after having become familiar with the teachings of the invention, and are contemplated as being within the scope of the invention.

In use, one or more data cartridges 20 may be added to storage magazine 10 as follows. With reference to FIG. 4, partition 68 may be moved in the direction of arrow 74 to enlarge the adjustable storage area 66 of storage magazine 10. According to one embodiment, partition 68 is moved in the media storage system 12 by the cartridge-engaging assembly 16. That is, as the cartridge-engaging assembly 16 is moved along positioning rail 22 (FIG. 1) adjacent storage magazine 10, the cartridge-engaging assembly 16 comes into contact with tab 69 on the partition 68 that extends into the path of the cartridge-engaging assembly 16. If the storage magazine 10 is equipped with the optional lock 85, it may be operated to disengage and allow partition 68 to be moved. As the cartridge-engaging assembly 16 continues to move along positioning rail 22, it causes the partition 68 to slide along channel 73 formed in the storage magazine 10.

In other embodiments, partition 68 may be moved when plunge mechanism 40 or other member is extended from the cartridge-engaging assembly 16 and contacts the partition 68. Alternatively, a separate drive system may be provided for moving partition 68. Other embodiments for moving partition 68 are also contemplated as being within the scope of the invention.

Accordingly, partition 68 moves in the direction of arrow 74 and expands the adjustable storage area 66 in storage magazine 10, as illustrated in FIG. 4. Preferably, storage magazine 10 is sized so that the data cartridges 20 already in the storage area 66 do not fall over when the partition 68 is moved. However, other embodiments are also contemplated in which suitable retaining members may be provided in the storage area 66 to retain the data cartridges 20 in an upright position. In any event, when the adjustable storage area 66 is enlarged so that the data cartridge (e.g., the third data cartridge 20") may be inserted therein, the cartridge-engaging assembly 16 may eject data cartridge 20" into the adjustable storage area 66 in the direction of arrow 75 in FIG. 4.

As an illustration, once cartridge-engaging assembly 16 has been properly positioned adjacent the desired location in the media storage system 12 (e.g., as shown in FIG. 3), drive system 52 may extend plunge mechanism 40 in the direction of arrow 54. As plunge mechanism 40 moves toward the cartridge access end 46 of housing 38, surface 50 pushes against data cartridge 20", thereby loading data cartridge 20" into the storage magazine 10. At the same time, finger assembly 56 disengages from notch 15 provided in data cartridge 20". If the plunge mechanism 40 is appropriately extended, data cartridge 20" will be moved over the optional gate 80, where so provided, and be fully inserted into the storage magazine 10 so that it properly "seats" therein.

After data cartridge 20" has been inserted into the storage magazine 10 (as shown in FIG. 6), drive system 52 once again retracts plunge mechanism 40 back into the cartridge-engaging assembly 16. Where storage magazine 10 is provided with the optional lock 85, lock 85 may be operated to hold partition 68 in a fixed position and release tension on the data cartridges 20 stored therein. For example, the solenoid may be actuated to push pin 83 in notch 84 formed in the back panel 63 of the storage magazine 10, as shown in FIG. 5, thereby fixing the position of partition 68 with respect to the storage magazine 10. The cartridge-engaging assembly 16 may then be moved to another location in the media storage system 12 to retrieve another data cartridge 20.

The cartridge-engaging assembly 16 may be operated as follows to retrieve a data cartridge (e.g., the second data cartridge 20') from storage magazine 10. The cartridge-engaging assembly 16 is positioned along the positioning rail 22 in the media storage system 12 so that it is adjacent the selected data cartridge 20' in storage magazine 10. Again with reference to FIG. 3, once the cartridge-engaging assembly 16 is properly positioned, drive system 52 moves plunge mechanism 40 in the direction of arrow 54 until finger assembly 56 engages data cartridge 20' (see FIG. 8 and FIG. 9). The arrangement of plunge mechanism 40 and finger assembly 56 is such that finger assembly 56 engages notch 15 on data cartridge 20' when the plunge mechanism 40 is at or near its fully extended position.

If storage magazine 10 is provided with the optional gate 80, gate 80 is moved to allow finger assembly 56 to engage data cartridge 20'. According to one embodiment, as plunge mechanism 40 is driven in the direction of arrow 54 to an extended position for engaging data cartridge 20', finger assembly 56 contacts guide portion 81 and depresses resilient member 82 to open the gate 80, as shown in FIG. 9. Accordingly, finger assembly 56 may pass over gate 80 and engage data cartridge 20' at notch 15.

After data cartridge 20' has been engaged by the finger assembly 56, drive system 52 may reverse the direction of plunge mechanism 40. Accordingly, the engaged data cartridge 20' is withdrawn from storage magazine 10 and is received in the cartridge-receiving cavity 44 defined by housing 38. The drive system 52 continues to retract plunge mechanism 40 and engaged data cartridge 20' until data cartridge 20' is received within the cartridge-receiving cavity 44 of the cartridge-engaging assembly 16 by an amount sufficient to allow the cartridge-engaging assembly 16 to move to another location in media storage system 12.

As data cartridge 20' is withdrawn from the storage magazine 10, the adjacent data cartridges 20, 20" may exert a frictional force on data cartridge 20' that is being withdrawn. Where this force causes adjacent data cartridges 20, 20" to slide outward from the storage magazine 10, optional retaining members 86 provided on the cartridge-engaging assembly 16 act to counter that force and retain the adjacent data cartridges 20, 20" within the storage magazine 10. Alternatively, or in addition thereto, gates 80, 80" also serve to retain the adjacent data cartridges 20, 20" within the storage magazine 10.

Once data cartridge 20' has been withdrawn, partition 68 may be moved in the direction of arrow 78 to a home position (i.e., toward side panel 64) to decrease the size of adjustable storage area 66 and collect the data cartridges 20 together in a registration position therein. According to one embodiment, partition 68 slides automatically under the force exerted by spring 72. Where a lock 85 is employed as described above, lock 85 may first be released to allow partition 68 to move.

Figure 7:
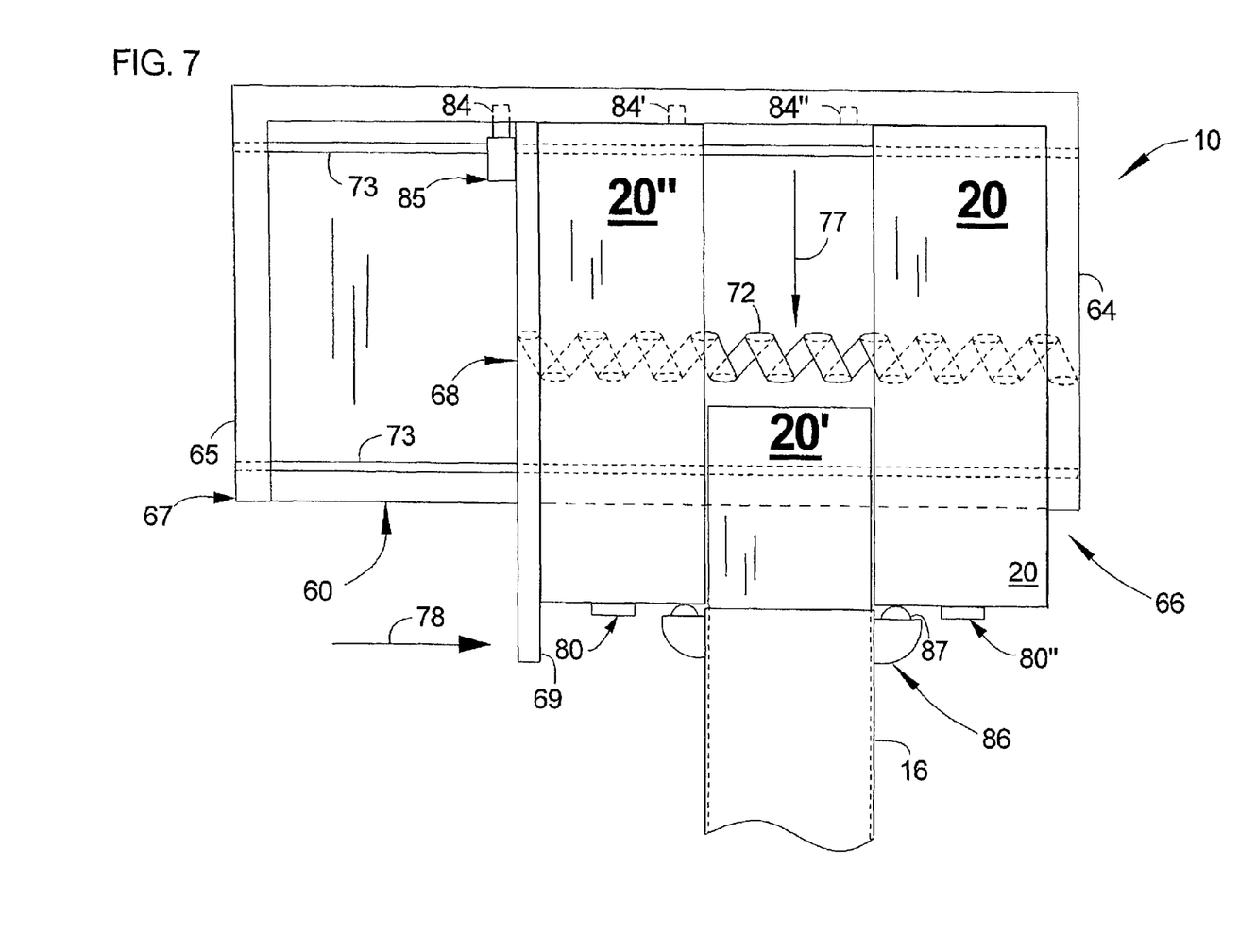
FIG. 7 is a simplified, plan view of the storage magazine shown in FIG. 4 illustrating withdrawal of the second data cartridge therefrom according to one embodiment of the invention.

After data cartridge 20' is removed from the storage magazine 10, one or more of the other data cartridge(s) 20, may be shifted next to one another and held in a registration position in the adjustable storage area 66. For example, when the second data cartridge 20' is removed from the storage magazine 10, as shown in FIG. 7, partition 68 may be moved in the direction of arrow 78, thereby shifting the first data cartridge 20 adjacent the third data cartridge 20" to fill the void or "gap" left therebetween. The data cartridges 20, 20" remaining in storage magazine 10 are thus maintained in an upright and aligned position (i.e., a registration position).

Although the low-overhead storage magazine 10 has been illustrated herein as it may be used according to various embodiments in a particular media storage system 12, it is understood that the teachings of the invention may be utilized in any of a wide range of media storage systems now known in the art or that may be developed in the future. Accordingly, the storage magazine 10 should not be regarded as limited to use with the particular media storage system 12 shown and described herein. It should also be noted that while the low-overhead storage magazine 10 is shown and described herein as it could be used to store and retrieve a linear tape open (LTO) and/or a digital linear tape (DLT) data cartridge having a standard size and configuration, it is not limited to any particular type or style of data cartridge 20. Indeed, the storage magazine 10 disclosed herein could be used with any type of storage medium (e.g., magnetic disk or tape, optical disk, etc.).

It is readily apparent that by eliminating or at least reducing the number of divider walls in storage magazine 10, the invention reduces undesirable overhead (i.e., the space taken up by the divider walls) and increases the storage density of media storage system 12 (i.e., the number of data cartridges that can be stored in a defined space). In addition, adjustable storage area 66 allows different types of data cartridges 20 to be stored therein without having to retrofit the storage magazine 10 to account for different size data cartridges (e.g., a thinner DLT and a wider LTO data cartridge). Also advantageously, the size of adjustable storage area 66 need not be formed to a precise tolerance because any variation in size is accommodated for by the movable partition 68. The invention therefore reduces the cost of manufacture and/or the cost of using storage magazines 10.

The invention may also comprise embodiments for identifying or "mapping" the position of one or more data cartridges 20 stored in media storage system 12. Media storage systems of the type described above are usually connected to a host computer system (not shown) that may access or store data on data cartridges 20. As an illustration, if the host computer system issues a request for data contained on a particular data cartridge 20, a control system (not shown) signals the cartridge-engaging assembly 16 to move along the positioning rail 22 until it is positioned adjacent the desired data cartridge 20. The cartridge-engaging assembly 16 may then remove data cartridge 20 and carry it to cartridge read/write device 18. After the read/write operation is complete, the cartridge-engaging assembly 16 may remove data cartridge 20 from cartridge read/write device 18 and return it to the storage magazine 10.

Accordingly, it is desirable to identify the position of particular data cartridges 20 within the media storage system 12. However, according to embodiments of the invention that have been described herein, the data cartridges 20 may not be stored in fixed positions within the media storage system 12. That is, when a data cartridge 20 is removed from the storage magazine 10, one or more of the other data cartridges may be shifted therein. As an illustration, when the second data cartridge 20' is removed from storage magazine 10 in FIG. 7 (e.g., for a data access operation at read/write device 18), the first data cartridge 20 may be shifted to occupy the position of the removed data cartridge. Likewise, when the second data cartridge 20' is later returned to storage magazine 10 (e.g., following the data access operation), it may occupy a different position in storage magazine 10 than it previously had (e.g., the position that the first data cartridge 20 previously occupied).

Figure 10:
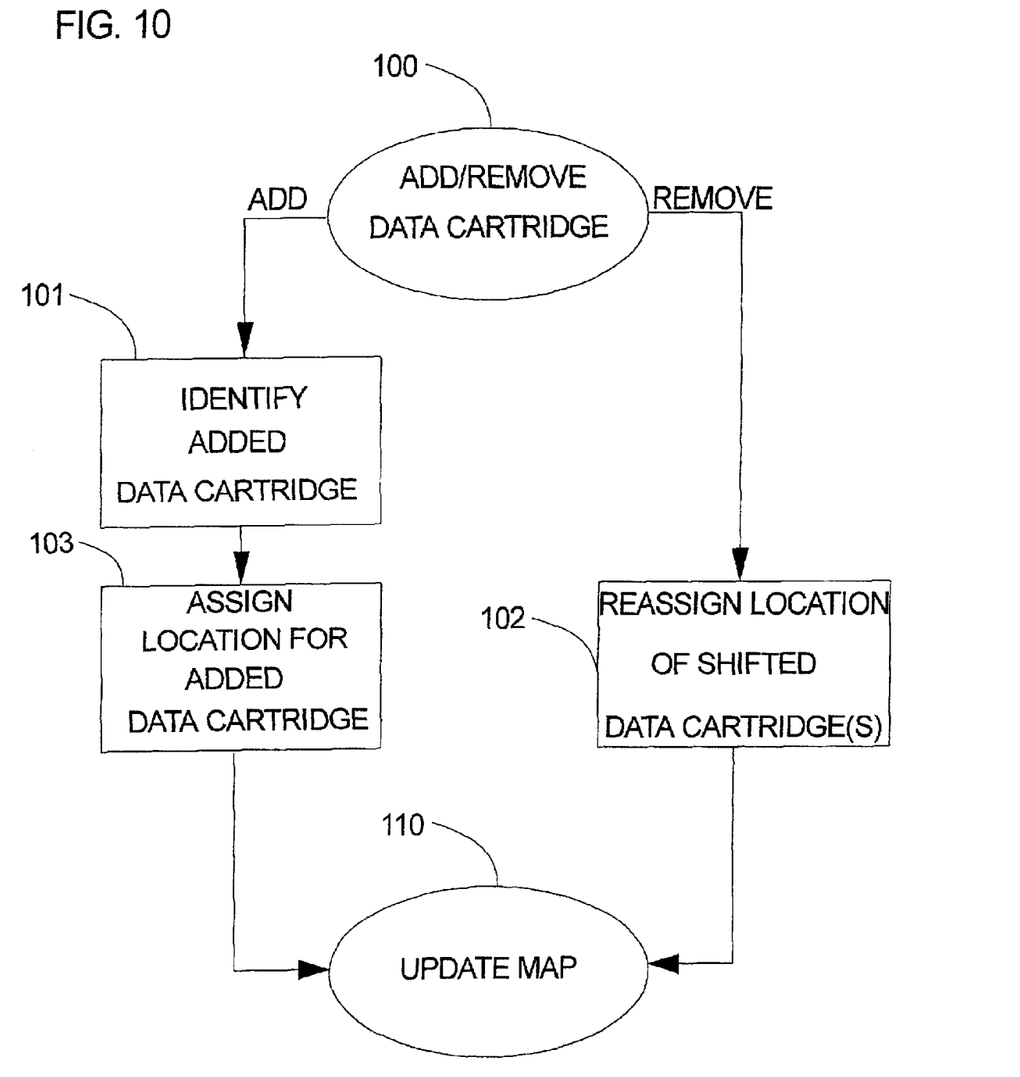
FIG. 10 is a flowchart illustrating an embodiment of a method for identifying data cartridges in a media storage system.

According to the teachings of the invention a method for mapping data cartridges 20 is shown and described herein with respect to FIG. 10. Before proceeding, however, it is noted that any suitable control logic may be provided as part of media storage system 12 and/or may be operable therewith for implementing the method of the invention. In addition, such control logic is readily understood in the art and therefore will not be described in further detail herein.

Continuing now with a description of an embodiment for mapping the position of one or more data cartridges 20 in media storage system 12, when data cartridge 20 is added to storage magazine 10 (step 100), data cartridge 20 may be identified (step 101), and assigned a location (step 103). Data cartridge 20 may be identified in any suitable manner. In one exemplary embodiment, data cartridge 20 may be assigned a descriptive identification, such as a department name, the type of data contained thereon, a date, or a combination thereof. In another exemplary embodiment, data cartridge 20 may be assigned a generic identification, such as "the third data cartridge". Likewise, the location may be assigned in any suitable manner. In one exemplary embodiment, the location may be assigned based on the nearest available location in the media storage system 12. In another exemplary embodiment, data cartridges 20 belonging to one department may be stored in one storage magazine 10, and data cartridges 20 belonging to another department may be stored in another storage magazine 10. In any event, the map (e.g., a database) is preferably updated with the identified data cartridge 20 and the assigned location within media storage system 12 (step 110) so that data cartridge 20 may be readily accessed therefrom when so requested.

In addition, when data cartridge 20 is removed from storage magazine 10 (step 100), the remaining shifted data cartridge(s) 20, if any, may be re-assigned a location within storage magazine 10 (step 102). Again, the map (e.g., a database) is preferably updated to indicate that one of the data cartridges 20 was removed and to indicate the new location assignments for the data cartridge(s) 20 remaining therein (step 110), if any, so that data cartridges 20 may be readily accessed therefrom when so requested.

The following is provided as an illustration of an embodiment for mapping the contents of media storage system 12. In this illustration, two data cartridges 20, 20' (i.e., First Data Cartridge and Second Data Cartridge) may be stored in the first two positions (i.e., Position 1 and Position 2, respectively) in one of the storage magazines 10 (i.e., Magazine 1), such as shown in FIG. 4. Accordingly, the map may comprise information such as that shown in Table 1.

TABLE 1

| CARTRIDGE ID | MAGAZINE ID | POSITION |
| --- | --- | --- |
| First Data Cartridge | 1 | 1 |
| Second Data Cartridge | 1 | 2 |

When another data cartridge is added to media storage system 12, it may be assigned an identification (i.e., Third Data Cartridge), and stored at an available position (i.e., Position 3) in one of the storage magazines (i.e., Magazine 1), such as shown in FIG. 6. Accordingly, the map may be updated as illustrated by Table 2 to reflect changes to the contents of media storage system 12.

TABLE 2

| CARTRIDGE ID | MAGAZINE ID | POSITION |
| --- | --- | --- |
| First Data Cartridge | 1 | 1 |
| Second Data Cartridge | 1 | 2 |
| Third Data Cartridge | 1 | 3 |

When one of the data cartridges (e.g., the second data cartridge 20') is removed from storage magazine 10, as shown in FIG. 7, the position that it occupied (i.e., Position 2) may be unassigned. In addition, where one or more other data cartridges (e.g., the third data cartridge 20") have been shifted the map may be updated to reflect this change, as illustrated by Table 3 to reflect changes to the contents of media storage system 12.

TABLE 3

| CARTRIDGE ID | MAGAZINE ID | POSITION |
| --- | --- | --- |
| First Data Cartridge | 1 | 1 |
| Third Data Cartridge | 1 | 2 |

It is noted that the steps of the method shown and described herein with respect to FIG. 10, and the illustration thereof, are not to be limited to any particular order. In addition, it is understood that other embodiments for identifying individual data cartridges 20 in media storage system 12 are also contemplated as being within the scope of the invention. As an example, each data cartridge 20 may be provided with a bar code label, and the cartridge-engaging assembly 16 may be provided with a bar code reader. Hence, the cartridge-engaging assembly 16 may be positioned adjacent data cartridge 20 in the media storage system 12 and the bar code label read therefrom, then repositioned adjacent the next data cartridge 20' until the desired data cartridge is located and can be retrieved. Other embodiments for identifying the data cartridges 20 stored in the media storage system 12 and for use with the storage magazine 10 of the present invention are also contemplated as being within the scope of the invention.

What is claimed is:

1. An apparatus comprising:
a frame assembly having a chamber formed therein sized to receive a plurality of data cartridges, the frame assembly having at least side panels and a rear panel defining the chamber;
a partition mounted to said frame assembly and movable in said chamber to define an adjustable storage area to receive said plurality of data cartridges;
at least one retaining member provided adjacent said adjustable storage area, said retaining member selectively retaining at least one data cartridge within said adjustable storage area, said retaining member adapted to be actuated from a first position to a second position to release the at least one data cartridge for retrieval from the adjustable storage area; and
a cartridge-engaging assembly adapted to move the partition to adjust the adjustable storage area.

2. The apparatus of claim 1, wherein said partition is movable to expand said adjustable storage area before inserting at least one of said plurality of data cartridges therein.

3. The apparatus of claim 1, wherein said partition is movable to contract said adjustable storage area when at least one of said plurality of data cartridges is removed therefrom.

4. The apparatus of claim 1, further comprising a guide system mounted to said frame assembly, wherein said partition is operatively associated with said guide system for adjusting the size of said adjustable storage area.

5. The apparatus of claim 1, further comprising a biasing member mounted to said frame assembly and operatively associated with said partition for biasing said partition toward a home position in said frame assembly.

6. The apparatus of claim 1, wherein the at least one retaining member retains at least one data cartridge within said adjustable storage area while another data cartridge is removed.

7. The apparatus of claim 1, wherein the retaining member comprises a gate resiliently attached to the frame assembly, the gate actuatable between the first position and the second position, the first position being a closed position and the second position being an open position.

8. The apparatus of claim 1, wherein the partition is movable to enable different numbers of data cartridges to be stored in the adjustable storage area.

9. The apparatus of claim 1, wherein the cartridge-engaging assembly is adapted to withdraw the at least one data cartridge from the adjustable storage area.

10. The apparatus of claim 1, wherein the cartridge-engaging assembly is adapted to actuate the retaining member from the first position to the second position.

11. A cartridge storage system comprising:
a low-overhead storage magazine, comprising:
a frame assembly having a chamber formed therein sized to receive a plurality of data cartridges;
a partition mounted to said frame assembly and movable in said chamber to define an adjustable storage area to receive said plurality of data cartridges; and
a lock mounted to said partition and operatively associated with said frame assembly to hold said partition in a fixed position in said frame assembly; and
a cartridge engaging assembly adapted to engage the data cartridges.

12. The cartridge storage system of claim 11, wherein said lock comprises:
a pin; and
a solenoid operable to move said pin between an open position and a closed position, said partition held in said fixed position when said pin is moved into said closed position.

13. The cartridge storage system of claim 11, further comprising at least one notch formed in said frame assembly, wherein said lock is operable to engage said notch and hold said partition in said fixed position.

14. The cartridge storage system of claim 11, wherein the partition is movable to enable different numbers of data cartridges to be stored in the adjustable storage area.

15. A method for adjusting a data cartridge storage area in a low-overhead storage magazine, comprising:
increasing the size of an adjustable storage area formed within said low-overhead storage magazine before inserting at least one data cartridge therein;
decreasing the size of said storage area formed within said low-overhead storage magazine after removing said at least one data cartridge therefrom; and
selectively retaining said at least one data cartridge within said low-overhead storage magazine,
wherein increasing the size of said adjustable storage area is in response to a cartridge-engaging assembly translating against a movable partition within said low-overhead storage magazine.

16. The method of claim 15, further comprising collecting a plurality of data cartridges immediately adjacent one another within said adjustable storage area.

17. The method of claim 15, wherein decreasing the size of said adjustable storage area is under the force of a biasing member.

18. A method for adjusting a data cartridge storage area in a low-overhead storage magazine, comprising:
increasing the size of an adjustable storage area formed within said low-overhead storage magazine before inserting at least one data cartridge therein;
decreasing the size of said storage area formed within said low-overhead storage magazine after removing said at least one data cartridge therefrom; and
selectively retaining said at least one data cartridge within said low-overhead storage magazine,
wherein increasing the size of said adjustable storage area is in response to a plunge mechanism translating against a movable partition within said low-overhead storage magazine.

19. A cartridge storage system comprising:
a storage magazine comprising:
a frame assembly having a chamber to receive cartridges;
a partition movable in the chamber to define an adjustable storage area for storing plural cartridges without dividers between the cartridges; and
a cartridge-engaging assembly to withdraw cartridges from the storage magazine,
wherein the cartridge-engaging assembly is movable to move the partition.

20. The cartridge storage system of claim 19, further comprising a rail, the cartridge-engaging assembly slidable on the rail to transport a cartridge from the storage magazine to another location.

21. The cartridge storage system of claim 19, wherein the partition has a tab extending into a path of the cartridge-engaging assembly, the cartridge-engaging assembly to contact the tab to move the partition.

22. The cartridge storage system of claim 19, wherein the cartridge-engaging assembly has a member extendable from the cartridge-engaging assembly to engage the partition for moving the partition.

23. The cartridge storage system of claim 19, wherein the storage magazine comprises a gate resiliently attached to the frame assembly, the gate actuatable between a closed position and an open position, the gate in the closed position to hold one of the data cartridges in the storage area, the gate in the open position to release the one of the data cartridges for retrieval from the storage area.

24. A method for mapping a plurality of data cartridges in a low-overhead storage magazine, comprising reassigning a shifted data cartridge to another location within said low-overhead storage magazine when another data cartridge is removed from the same storage area;

wherein the storage magazine has a chamber to store the plurality of data cartridges without dividers between the data cartridges, wherein the reassigning act comprises reassigning the shifted data cartridge to another location within the chamber when another data cartridge is removed from the chamber.

25. The method of claim 24, further comprising updating a map with the location of any reassigned data cartridges in said low-overhead storage magazine.

26. The method of claim 24, further comprising assigning an added data cartridge to a new location within said low-overhead storage magazine.

* * * * *